United States Patent
Krampl et al.

(10) Patent No.: US 9,834,416 B2
(45) Date of Patent: Dec. 5, 2017

(54) SUPPORT FOR SUPPORTING A PERSON CONVEYING DEVICE ON A STRUCTURE

(71) Applicant: Inventio AG, Hergiswil (CH)

(72) Inventors: David Krampl, Vienna (AT); Gerald Winkler, Neusiedl am See (AT); Günter Horvath, Vienna (AT); Günther Niedermayer, Vienna (AT); Michael Matheisl, Vösendorf (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/101,979

(22) PCT Filed: Nov. 14, 2014

(86) PCT No.: PCT/EP2014/074637
§ 371 (c)(1),
(2) Date: Jun. 6, 2016

(87) PCT Pub. No.: WO2015/082195
PCT Pub. Date: Jun. 11, 2015

(65) Prior Publication Data
US 2016/0304322 A1    Oct. 20, 2016

(30) Foreign Application Priority Data
Dec. 6, 2013  (EP) .................................. 13196071

(51) Int. Cl.
*B66B 23/00* (2006.01)
*B66B 21/02* (2006.01)
*B65G 21/00* (2006.01)

(52) U.S. Cl.
CPC .............. *B66B 23/00* (2013.01); *B65G 21/00* (2013.01); *B66B 21/02* (2013.01); *B65G 2207/20* (2013.01)

(58) Field of Classification Search
CPC ......... B66B 21/02; B66B 21/04; B66B 23/00; B65G 21/00; B65G 2207/20
USPC ................................................ 198/326, 321
See application file for complete search history.

(56) References Cited

U.S. PATENT DOCUMENTS 6,129,198 A * 10/2000 Nusime .................. B66B 23/00
                                                              198/321
6,247,574 B1 * 6/2001 Yamaguchi ............. B66B 21/00
                                                              198/326
6,637,580 B1    10/2003 Sneed
(Continued)

FOREIGN PATENT DOCUMENTS

| EP | 0 963 941 A1 | 8/2003 |
| JP | S53 52591 | 5/1978 |
| JP | S58 75273 | 5/1983 |

(Continued)

*Primary Examiner* — Gerald McClain
*Assistant Examiner* — Keith R Campbell
(74) *Attorney, Agent, or Firm* — Ladas & Parry LLP

(57) ABSTRACT

A support system supports the two ends of a passenger-transportation device in a built structure. The support system 6 has a swiveling support-point at a first end with a vertical swivel-axis. The second end contains a floating support-point for absorbing horizontal movements perpendicular to the swivel-axis. The floating support-point has at least one rolling element by means of which a sliding friction caused by the occurrence of horizontal movements in the floating support-point can be transformed into combined sliding-and-rolling friction or rolling friction.

9 Claims, 4 Drawing Sheets

(56) References Cited

U.S. PATENT DOCUMENTS 9,254,986 B2 * 2/2016 Inoue .................. B66B 21/02

FOREIGN PATENT DOCUMENTS

| JP | 10316351 A | * | 12/1998 |
| JP | H10 316351 A |  | 12/1998 |
| JP | 2 886527 B1 |  | 4/1999 |
| JP | 2000 095471 A |  | 4/2000 |

* cited by examiner

SUPPORT FOR SUPPORTING A PERSON CONVEYING DEVICE ON A STRUCTURE

The invention relates to a support system for supporting the two ends of a passenger-transportation device, in particular an escalator or a moving walk, in a built structure.

BACKGROUND OF THE INVENTION

Normally, escalators and/or moving walks are supported at their two ends on elastic supporting elements which each consist of a steel plate and an elastic intermediate layer. Disadvantageous in this support system is that, in the event of excessive movements, lateral forces can arise by whose effects a truss, or frame, of the passenger-transportation device can be deformed.

These excessive movements arise, for example, through the action on a built structure of vibrations and shocks from earthquakes. The lateral forces arise as a result of the mass-inertia of the passenger-transportation device itself and through the movements of stories of the built structure which move relative to each other in horizontal direction. A passenger-transportation device that connects two stories can be caused, by the horizontal movements of the stories, to jump out of the supports system, or damage to the built structure and/or to the escalator and/or the moving walk can occur.

In order to prevent such damage, EP 0 963 941 B1 proposes a support system for supporting the two ends of a passenger-transportation device in a built structure. Provided at the first end of the passenger-transportation device, the support system has a swiveling support-point whose swivel-axis with regard to its installed position is arranged vertically. Provided at the second end of the passenger-transportation device, the support system further has a floating support-point, which is embodied for the purpose of absorbing horizontal movements that occur perpendicular to the swivel-axis. Arranged at the sides of the floating support-point are spring elements which, after a lateral movement, center the passenger-transportation device again.

The solution which is proposed in EP 0 963 941 B1 enables a prevention of damage, provided that a construction-dependent permissible velocity and/or frequency of the lateral movements is not exceeded. In the event of very rapid horizontal movements, and hence a high frequency of the vibrations and shocks that act on a built structure, the spring elements that are provided for centering act as quasi-rigid bodies and prevent an absorption of the horizontal movements within the floating support-point. Furthermore, the solution with springs is not suitable for areas with strong earthquakes, since the maximum possible displacement is greatly limited by the springs.

The task of the present invention is to create a support system which can also decouple rapid horizontal movements in the area of the support system.

BRIEF DESCRIPTION OF THE INVENTION

This task is solved by a support system for supporting the two ends of a passenger-transportation device in a built structure. Provided at the first end of the passenger-transportation device, this support system has a swiveling support-point whose swivel-axis with regard to its installed position is arranged vertically. Provided at the second end of the passenger-transportation device, the support system further has a floating support-point for the purpose of absorbing horizontal movements that occur perpendicular to the swivel-axis. In order to be able to absorb the horizontal movements independent of their velocity, the floating support-point has at least one rolling element. Through this at-least one rolling element, a sliding friction that is caused in the floating support-point by horizontally occurring movements can be transformed into combined sliding-and-rolling friction or rolling friction.

In the case of very slow, and consequently low-frequency, vibrations, the second end of the passenger-transportation device essentially follows the movements of the adjoining story. From a certain threshold velocity, which essentially depends on the coefficient of sliding friction, the supported load of the floating load-point, and the mass-inertia of the passenger-transportation device, the horizontal movements are partly absorbed in the floating support-point in that the second end of the passenger-transportation device moves relative to the adjoining story. If these vibrations have small amplitudes, the structure of the passenger-transportation device, in particular its truss, is only stressed within the elastic range, so that no plastic deformations occur therein. However, if these vibrations have large amplitudes, after a short sliding distance, through the at-least one rolling element, the frictional resistance in the floating support-point is drastically reduced, so that the lateral force which acts on the second end as a consequence of the frictional resistance is virtually eliminated and the truss is relieved.

The present invention further prevents that, in the neutral operating position, the second end swings laterally, since the static friction of the floating support-point cannot be overcome by the boarding of the users. In addition, in the neutral operating position, the at-least one rolling element is unloaded and hence, as time progresses, not plastically deformed by a high static load.

In order that sliding-frictional characteristics are present which are as far as possible defined, the floating support-point has a sliding bearing. Preferably arranged parallel to the two side edges of the at-least one sliding bearing which extend parallel to the longitudinal extent of the escalator or moving walk are rolling elements. The sliding friction that occurs in the event of horizontal movements in both directions of movement can thereby be transformed into combined sliding-and-rolling friction or rolling friction.

The at-least one sliding bearing can have an upper sliding element and a lower sliding element. The upper and lower sliding elements each have a sliding surface which faces the other. The sliding surfaces can have suitable surface structures which produce a desired coefficient of sliding friction of the sliding bearing. Through the floating support-point, also longitudinal elongations of the passenger-transportation device can be absorbed. However, with a sufficiently widely designed sliding bearing, the floating support-point can also absorb displacements of the two stories relative to each other which take place in the direction of the longitudinal extent of the passenger-transportation device.

In order to facilitate the transformation of the sliding friction into combined sliding-and-rolling friction or rolling friction, on each side-edge of the upper sliding element which faces towards a rolling element, a run-up ramp can be embodied. This run-up ramp serves the running-up of the upper sliding element onto the rolling element. In the event of a running-up, the upper sliding element can at least partly lift off the lower sliding element and then roll further on the at-least one rolling element.

In order to provide a suitable travel path for the rolling element, the floating support-point can have a support-carrier which can be anchored on the built structure. The presence of a support-carrier enables connection of the lower sliding element with the support-carrier. The upper sliding element is connected in suitable manner with the second end of the passenger-transportation device. Further, between the upper sliding element and the second end, a leveling device can be arranged. This leveling device serves the distortion-free and flush alignment of the second end with the story floor. Used as leveling device can be, for example, setting screws, distance plates, distance disks, distance sleeves, and other suchlike.

Arranged at the side of the run-up ramp, the at-least one rolling element can be connected with the support-carrier by means of a mechanically releasable adhesive. The rolling element then remains in its position within the floating support-point until, through a horizontal movement, the upper sliding element breaks the rolling element free upon run-up. Self-evidently, instead of an adhesive, also temperature-stable lubricating grease, installation grease, or adhesive grease can be used.

For the purpose of limiting the rolling distance of the at-least one rolling element, the support-carrier can also have at least one limit-stop. This has the advantage that the at-least one rolling element is always situated, and available, in a delimited area.

In order that vibrations that occur through the operation of the passenger-transportation device cannot transfer to the building, the lower sliding element preferably has a damping element and/or a sound insulation.

A already expounded further above, the passenger-transportation device can be embodied as an escalator or as a moving walk. Passenger-transportation devices can be provided with the support system according to the invention not only ex works. Existing passenger-transportation devices can also be retrofitted with the support system according to the invention. Such a modernization can comprise the steps:

that the two ends of the existing passenger-transportation device are raised together with each other or one after the other, that the two ends of the existing passenger-transportation device and its support-points on the built structure are prepared for the accommodation of a support system according to the invention, that the swiveling support-point of the support system is arranged between the first end of the passenger-transportation device and its support-point on the built structure, and that the floating support-point of the support system is arranged between the second end of the passenger-transportation device and its support-point on the built structure.

The support system for supporting the two ends of a passenger-transportation device in a built structure is expounded in greater detail below in relation to examples and by reference to the drawings. Shown are in

DETAILED DESCRIPTION OF THE INVENTION

Figure 1:
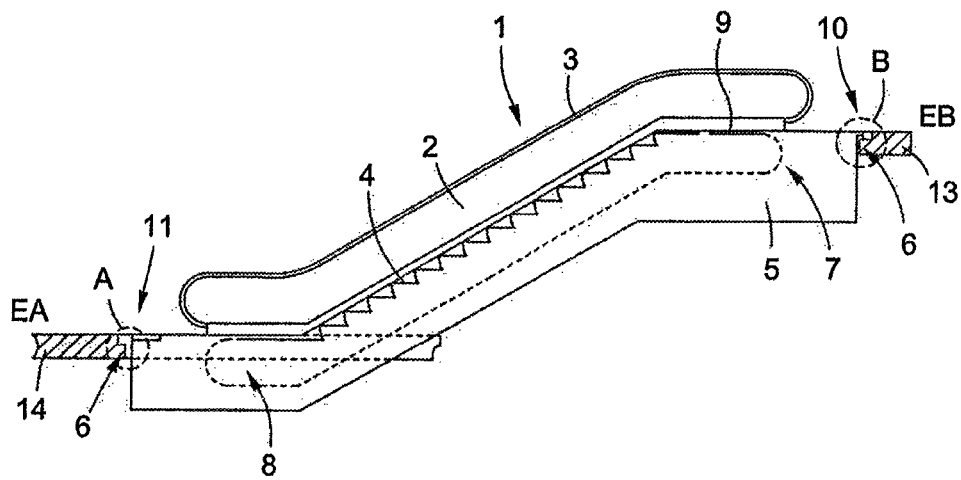
FIG. 1: in diagrammatic depiction, a passenger-transportation device in the side view.
Figure 2:
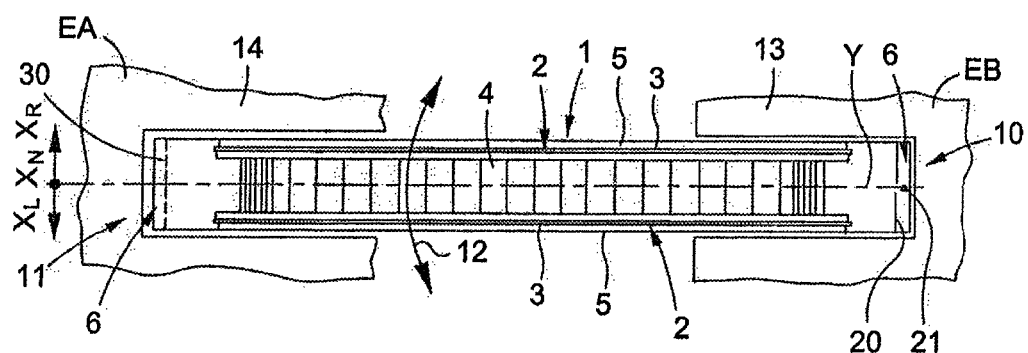
FIG. 2: in diagrammatic depiction, the passenger-transportation device according to FIG. 1 in the plan view.

Depicted diagrammatically in FIG. 1 is a passenger-transportation device 1 in the side view. FIG. 2 shows a diagrammatical depiction of the passenger-transportation device 1 according to FIG. 1 in plan view. Following below, the two FIGS. 1 and 2 are jointly described.

The passenger-transportation device 1 can be an escalator as well as a moving walk. It joins a first story EA with a second story EB. The passenger-transportation device 1 has a truss 5, or frame 5, with two reversing zones 7, 8, between which a step-band 4, or pallet-band 4, which is indicated only in outline, is guided in circulating manner. Arranged on a balustrade 2 is a handrail 3. At its lower extremity, by means of a balustrade skirt 9, the balustrade 2 is connected with the truss 5.

The passenger-transportation device 1, or its truss 5 respectively, has a first end 10 and a second end 11, which, by means of a support system 6, are supported on support-points 13, 14 of the first story EA and of the second story EB respectively of a built structure. Arranged at the first end 10, the support system 6 has a swiveling support-point 20 and, arranged at the second end 11, a floating support-point 30. The swiveling support-point 20 has a swivel-axis 21 which, with regard to its installed position, is arranged vertically. The floating support-point 30 can absorb horizontal movements 12 that occur perpendicular to the swivel-axis 21.

Figure 3:
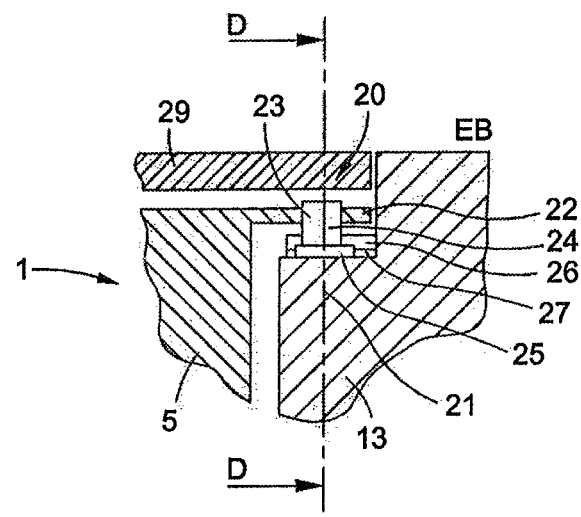
FIG. 3: a larger depiction of the detail designated B in FIG. 1, depicting a swiveling support-point of the support system arranged at a first end of the passenger-transportation device.
Figure 4:
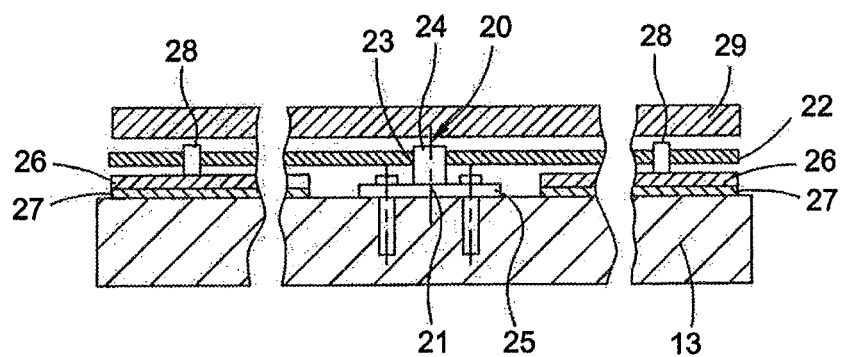
FIG. 4: a cross-section through the swiveling support-point depicted in FIG. 3 along the line D-D.

Depicted in FIGS. 3 and 4 are the most important components of the swiveling support-point 20 which is described below, FIG. 3 showing a larger view of the detail designated B in FIG. 1. FIG. 4 shows a cross-section through the swiveling support-point 20 depicted in FIG. 3 along the line D-D.

A support-carrier 22, which is arranged on the truss 5, is provided with a borehole 23 which is arranged in the central longitudinal axis Y (see FIG. 2) of the passenger-transportation device 1. Protruding into this borehole 23, and serving as swivel-point, or swivel-axis 21, for the passenger-transportation device 1, is a pin 24, which, by means of a fastening plate 25, is joined with the support-point 13 of the built structure. The swiveling support-point 20 further contains, arranged between the support-point 13 of the built structure and the support-carrier 22, supporting assemblies 26, 27 which, in the present exemplary embodiment, each comprise a supporting plate 26 and a damping element 27. The damping element 27 can be, for example, a plastic insert, a rubber-bonded metal assembly, or other suchlike. Arranged between the supporting plate 26 and the support-carrier 22 is at least one leveling device 28 which, as depicted in the present exemplary embodiment, can be a setting screw 28. The swiveling support-point 20 is bridged-over by a floor-cover 29, which is indicated in outline.

Figure 5:
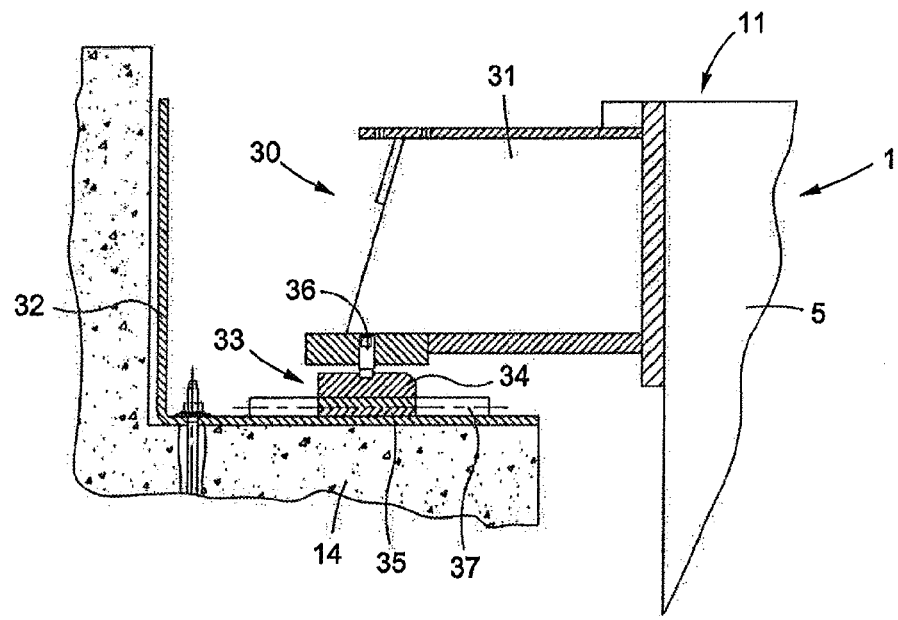
FIG. 5: a larger cross-sectional depiction of the detail designated A in FIG. 1, depicting a floating support-point of the support system arranged at a second end of the passenger-transportation device.

FIG. 5 shows a larger depiction of a cutout of the floating support-point 30, which in FIG. 1 is designated Detail A.

Figure 6:
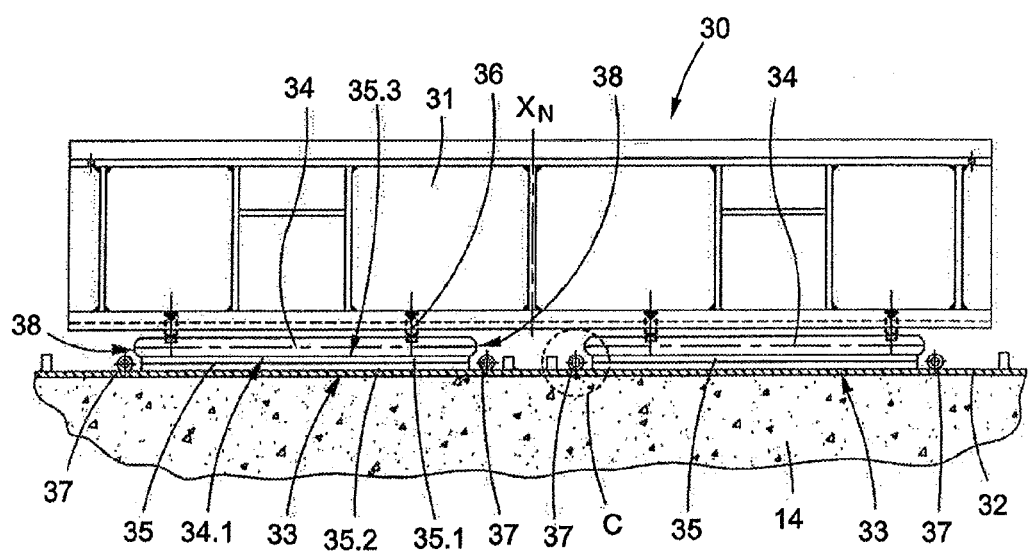
FIG. 6: a front view of the floating support-point depicted in FIG. 5 in its neutral, or aligned, operating position.

FIG. 6 shows a front view of the floating support-point 30 depicted in FIG. 5 in its neutral, or aligned, operating position $X_N$ in the support-point 14 of the built structure. Also these two figures are jointly described below. As already described further above, the floating support-point 30 is arranged at the second end 11 of the passenger-transportation device 1. Clearly to be seen here is that the floating support-point 30 has an exceptionally rigidly embodied box-beam which, at the second end 11 of the passenger-transportation device 1, is tightly connected with the truss 5 of the latter. The floating support-point 30 further has a support-carrier 32, which is tightly connected with the support-point 14 of the built structure and forms the basis for two sliding bearings 33. The two sliding bearings 33 each have an upper sliding element 34 and a lower sliding element 35, whereof the lower sliding element 35 contains a sliding plate 35.1 and a sliding element 35.2. The damping element 35.2 can be, for example, a plastic insert, a rubber-bonded metal assembly, or other suchlike. In the neutral operating position $X_N$, the upper sliding element 34 rests with the upper sliding surface 34.1 on the lower sliding element 35 with the lower sliding surface 35.3. The sliding surfaces 34.1, 35.3 can have suitable surface structures which produce a desired coefficient of sliding friction of the sliding bearing.

Since the second end 11 of the passenger-transportation device 1 must also be aligned with the support-point 14 of the built structure, also provided between the upper sliding element 34 and the rigid box-beam 31 are leveling devices 36.

Arranged in floating manner on the support-carrier 32 at both sides of the sliding bearing 33 are rolling elements 37. The rolling elements 37 of the depicted exemplary embodiment are embodied in the form of a hollow cylinder. As can be seen in FIG. 5, their central longitudinal axes extend parallel to the central longitudinal axis Y (see FIG. 2) of the passenger-transportation device 1 and hence also parallel to the side-edges 38 of the at-least one sliding bearing 33 which extend in the longitudinal extent of the escalator 1 or moving walk 1.

Figure 7:
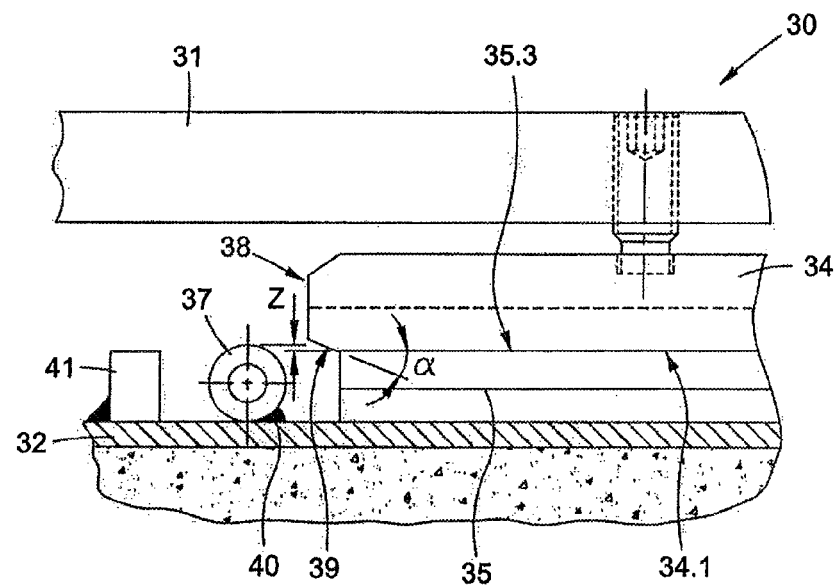
FIG. 7: a larger view of the detail designated C in FIG. 6.

FIG. 7 shows a larger view of the detail designated C in FIG. 6. As can be seen in FIG. 7, the diameter of the rolling element 37 is somewhat greater than the thickness of the lower sliding-element 35. This difference in height, which is designated Z, allows an at-least partial raising, or taking-off, of the upper sliding surface 34.1 from the lower sliding surface 35.3, when the upper sliding element 34 runs-up onto the rolling element 37. In order for a safe running-up to be assured, the height difference Z should not be too large and can be in the range 0.1 mm to 3.0 mm, preferably 0.4 mm to 2 mm, particularly preferably 0.5 mm to 1 mm. From this, it is also understandable why the box-beam 31 must be embodied especially stiffly. If the box-beam were highly elastic, no raising of the upper sliding surface 34.1 from the lower sliding surface 35.3 could take place, since the box-beam would adapt to the higher contour of the rolling element 37. In order to facilitate running-up, embodied on each side-edge 38 of the upper sliding element 34 that faces a rolling element 37 and is parallel to the rolling element 37 is a run-up ramp 39. The run-up ramp 39 should be not too steep and have a ramp-angle α between 5° and 30°.

So that the rolling element 37 maintains a defined position within the floating support-point 30 until horizontal movements occur, the former can be connected with the support carrier by means of a mechanically releasable adhesive 40, a temperature-stable lubricating grease, an installation grease, or an adhesive grease. That the rolling element 37 does not roll about inside the floating support-point 30 already on the occurrence of the slightest vibration is thereby prevented. As adhesive 40, for example, air-hardening silicone-rubber can be used. As soon as the upper sliding element 34 reaches the rolling element 37 as a result of the occurrence of horizontal movements, the latter is broken away from the support-carrier 32 and can roll without hindrance. In order to limit its rolling distance, provided on the support-carrier 32 for each rolling element 37 can be at least one limit-stop 41.

Figure 8:
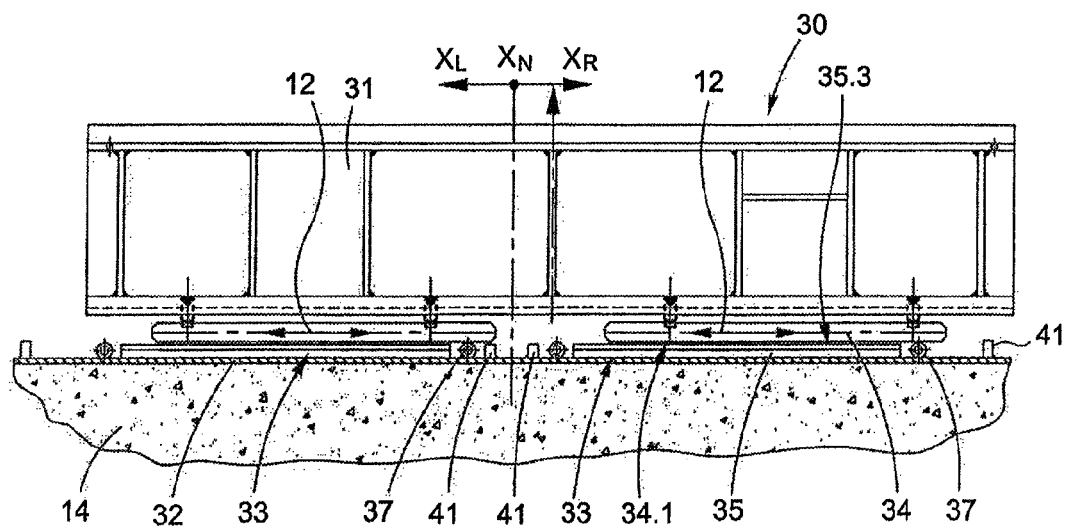
FIG. 8: the floating support-point depicted in FIG. 6 in its displaced position caused by the occurrence of horizontal movements.

The function of the floating support-point 30 is also visible from FIG. 8. This shows the floating support-point 30 in a displaced position $X_R$ caused by the occurrence of horizontal movements 12. The progress of the horizontal movements 12 of the upper sliding element 34 relative to the lower sliding element 35 from the neutral operating position $X_N$ into the displaced positions $X_R$, $X_L$ is described below.

When rapid horizontal movements 12 occur, by means of which the static friction between the sliding surfaces 34.1, 35.3 of the sliding bearing 33 is overcome, a relative displacement takes place between the upper sliding element 34 and the lower sliding element 35. Sliding friction then occurs until the upper sliding element 34 runs-up onto a rolling element 37. The running-up side of the upper sliding element 34 is raised and, within the floating support-point 30, the sliding friction is thereby transformed into combined sliding-and-rolling friction (sliding friction and rolling friction). Depending on the rolling distance of the upper sliding element 34 on the rolling element 37, a complete separation of the two sliding surfaces 34.1, 35.3 of the sliding bearing can occur, with the result that, within the floating support-point 30, a virtually pure rolling friction prevails. Since natural occurrences such as earthquakes are not normally characterized by individual shocks, but by tremors of greatly diminishing amplitude, the direction of movement of the horizontal movement 12 of the box-beam 31 relative to the support-carrier 32 can change into the opposite direction before the rolling elements 37 reach the assigned limit-stops 41. In the subsequent movement 12 in the opposite direction, in the floating support-point 30, first rolling friction and combined rolling-and-sliding friction prevail until the upper sliding element 34 leaves the rolling element 37 and slides over the lower sliding element 35. The movement progression described above then repeats itself towards the other side.

After an incident or earthquake, the passenger-transportation device 1 depicted in FIG. 2 must be inspected and, if necessary, dismantled and maintained. When this is done, also the floating support-point 30 can be inspected and, if necessary, the second end 11 of the passenger-transportation device 1 can be brought out of a displaced position $X_R$ or $X_L$ and aligned into the neutral operating position $X_N$. Through the transformation of the sliding friction into combined sliding-and-rolling friction or rolling friction, a flexural loading of the truss 5 is sufficiently reduced that the stories EA, EB can move relative to each other while, as a result of its mass-inertia, the passenger-transportation device 1 itself moves only slightly.

Although the invention has been described by the depiction of specific exemplary embodiments, it is self-evident that, with knowledge of the present invention, numerous further variant embodiments can be created, for example, in that, on the support-carrier 32, instead of the rolling elements 37, rolling-mounted rollers, balls, ball-races, or other suchlike can be arranged. Further, the run-up ramps 39 can also be arranged on the lower sliding element 35 and the rolling-mounted rollers on the box-beam 31. Self-evidently, instead of rolling elements 37 in the form of a tubular cylinder, also solid-cylindrical rolling elements without borehole can be used. The support-carrier 32 can further have rolling tracks for the rolling elements 37 which are slightly inclined relative to the sliding bearing 33, so that, after an incident, as a result of gravity, the second end 11 of the passenger-transportation device 1 aligns itself at least partly into the neutral operating position $X_N$ again.

The invention claimed is:

1. A support system for supporting two ends of a passenger-transportation device in a built structure comprising:
    a swiveling support at a first end of the passenger-transportation device with a swivel-axis arranged vertically with respect to its installation position; and
    a floating support at a second end of the passenger-transportation device for absorbing horizontal movements that occur perpendicular to the swivel-axis,
    wherein the floating support has at least one sliding bearing and at least one rolling element arranged parallel to two side-edges of the at least one sliding bearing for transforming a sliding friction which occurs in the floating support through horizontally occurring movements into a combined sliding-and-rolling friction or rolling friction;
    the two side-edges of the at least one sliding bearing extending parallel to a longitudinal extent of the escalator or moving walk.

2. The support system according to claim 1, wherein the at least one sliding bearing has an upper sliding element and a lower sliding element, each having a sliding surface for mutual sliding engagement.

3. The support system according to claim 2, wherein a run-up ramp is located on a side-edge of the upper sliding element that faces a rolling element, which run-up ramp provides for a running-up of the upper sliding element onto the rolling element whereby, after a lateral, horizontal movement of the second end, the upper sliding element is at least partly raised from the lower sliding element.

4. The support system according to claim 2, wherein the floating support has a support-carrier for anchoring on the built structure.

5. The support system according to claim 4, wherein the upper sliding element is connected with the second end of the passenger-transportation device and the lower sliding element is connected with the support-carrier.

6. The support system according to claim 3, wherein the at least one rolling element is arranged at the side of the run-up ramp and is connected with the support carrier by a mechanically releasable adhesive, a temperature-stable lubricating grease, an installation grease, or an adhesive grease.

7. The support system according to claim 4, wherein the support carrier has at least one limit stop for limiting a rolling distance of the at least one rolling element.

8. The support system according to claim 4, wherein the lower sliding element has a damping element.

9. A passenger-transportation device comprising an escalator or a moving walk with a support system according to claim 1.

* * * * *